(No Model.)

W. H. WILSON.
HARROW.

No. 373,709. Patented Nov. 22, 1887.

Witnesses,
Robert Everett,
Percy B. Hills.

Inventor:
William H. Wilson.
By James L. Norris.
Atty.

UNITED STATES PATENT OFFICE.

WILLIAM H. WILSON, OF GROESBECK, TEXAS.

HARROW.

SPECIFICATION forming part of Letters Patent No. 373,709, dated November 22, 1887.

Application filed June 27, 1887. Serial No. 242,643. (No model.)

*To all whom it may concern:*

Be it known that I, WILLIAM H. WILSON, a citizen of the United States, residing at Groesbeck, in the county of Limestone and State of Texas, have invented new and useful Improvements in Harrows, of which the following is a specification.

My invention relates to harrows, and the purpose thereof is to provide a simple and comparatively inexpensive structure, whereby the harrow-frame may be extended or contracted to conform to the character of the work to be performed, and wherein the handles are connected to the frame in a simple and novel manner.

The invention consists in the several novel features of construction and new combinations of parts, hereinafter fully set forth, and definitely pointed out in the claims which follow this specification.

Figure 1:
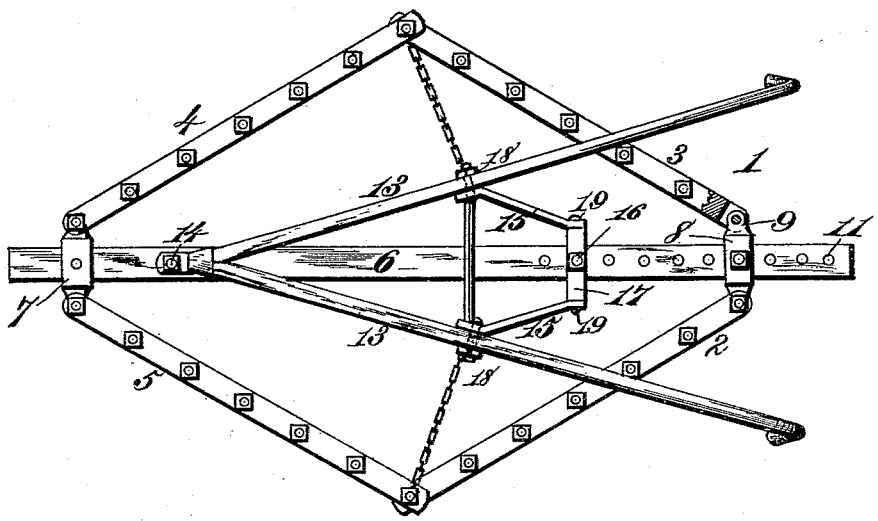
Figure 2:
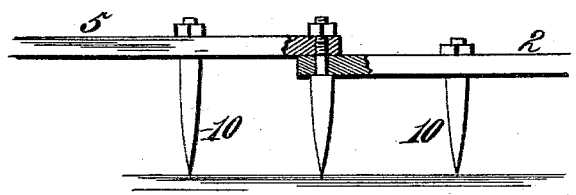

Referring to the drawings forming part of this application, Figure 1 is a plan view of a harrow embodying my invention. Fig. 2 is a partial section on an enlarged scale.

The reference-numeral 1 denotes the frame of the harrow, which I make of iron having a thickness of about one-half an inch and a width of one and a half or two inches. The harrow-frame is composed of four separate sections, 2, 3, 4, and 5, which are pivotally connected to each other and to a central rib, 6, in the manner to be described. The rib or beam 6 extends from front to rear of the harrow and carries at its forward and rear ends loops 7, which may be adjusted longitudinally upon said beam, each being held at any desired point by means of a bolt, 8, passing through both the loop and the beam. Each loop has upon each side of the beam 6 an ear or lug, 9, which lies in a slot in the end of a frame-section of the harrow, the connection between the two being preserved by the shank of one of the harrow-teeth 10, passing through the frame-section and the lug 9. A series of perforations, 11, in the beam 6 permits the longitudinal adjustment thereon of the loop 7. Each frame-section, as 2, is connected to the adjacent section, as 3, by lapping the ends of said sections and passing through both the extended or prolonged shank 12 of one of the harrow-teeth. Upon the central beam, 6, is mounted the handles 13, having their forward ends connected thereto by the shank 14 of one of the harrow-teeth. To each handle is pivoted, as at 18, the upper end of a brace-rod, 15, said rods extending rearward and downward and connected at their lower rear ends by pivots, as at 19, with a cross-bar, 17, resting on the beam 6 and adjustable along the same by a bolt, 16, adapted to enter the perforations. By adjusting the cross-bar in the proper direction and securing it by the bolt the brace-rods are operated to raise or lower the handles. By drawing the rearward end or loop 7 forward the frame will be expanded laterally and the distance between the teeth will be correspondingly increased, and vice versa.

By connecting the parts in the manner described—that is, by using the harrow-teeth as the pivotal connections—the construction is materially simplified and the working-teeth of the frame are extended considerably beyond what they would be if the said connections were made simply by pivoted bolts.

Stays 18 may be used to connect the handle-frame to the sides of the harrow-frame.

What I claim is—

1. A harrow consisting of a central longitudinal beam, 6, the jointed toothed frame pivoted to supports on the beam, the handles 13, connected at the forward end to the beam, and the brace-rods 15, pivoted to the handles and to a cross-bar, 17, adjustable on the beam, substantially as described.

2. A harrow consisting of a central longitudinal beam, 6, having perforations 11, the jointed toothed frame pivoted to supports on the beam, the handles 13, connected at their forward ends to the said beam, the brace-rods 15, pivoted to the handles and to a cross-bar, 17, resting on the beam, and the vertical bolt 16, adapted to the perforations in the beam to adjust the cross-bar thereupon, and thereby raise and lower the handles, substantially as described.

In testimony whereof I have affixed my signature in presence of two witnesses.

W. H. WILSON.

Witnesses:
J. W. STEPHENS,
J. B. REILLY.